(12) United States Patent
Schreiber

(10) Patent No.: US 8,601,917 B2
(45) Date of Patent: Dec. 10, 2013

(54) DIAMETER MEASUREMENT IN TURNING MACHINES

(75) Inventor: Leo Schreiber, Schwäbisch Gmünd (DE)

(73) Assignee: MAG IAS GmbH, Goppingen (DE)

( * ) Notice: Subject to any disclaimer, the term of this patent is extended or adjusted under 35 U.S.C. 154(b) by 197 days.

(21) Appl. No.: 13/131,763

(22) PCT Filed: Dec. 9, 2009

(86) PCT No.: PCT/EP2009/066723
§ 371 (c)(1),
(2), (4) Date: Aug. 9, 2011

(87) PCT Pub. No.: WO2010/066786
PCT Pub. Date: Jun. 17, 2010

(65) Prior Publication Data
US 2011/0283847 A1    Nov. 24, 2011

(30) Foreign Application Priority Data

Dec. 10, 2008  (DE) .................. 10 2008 061 444

(51) Int. Cl.
*B23B 5/22* (2006.01)
(52) U.S. Cl.
USPC ............... 82/1.11; 82/142; 33/555.1; 33/628
(58) Field of Classification Search
USPC ........ 33/555.1, 556, 558, 559, 561, 503, 628; 82/1.11, 118, 142; 408/2; 409/133
See application file for complete search history.

(56) References Cited

U.S. PATENT DOCUMENTS

| 4,031,368 | A | | 6/1977 | Colding et al. |
| 4,774,753 | A | | 10/1988 | Holy et al. |
| 5,166,891 | A | * | 11/1992 | Reiter et al. ............ 702/157 |
| 5,704,132 | A | * | 1/1998 | Bourne .................... 33/628 |
| 6,490,805 | B1 | * | 12/2002 | Forschler et al. .......... 33/542 |
| 7,674,079 | B2 | * | 3/2010 | Schawe .................... 409/66 |

FOREIGN PATENT DOCUMENTS

| DE | 3241710 | | 5/1984 |
| DE | 3610160 | | 10/1986 |
| DE | 3831592 | | 3/1989 |
| DE | 4032361 | | 4/1992 |
| DE | 4032361 A1 | * | 4/1992 |
| EP | 0199705 | | 10/1986 |
| JP | 61131854 A | * | 6/1986 |
| JP | 62130156 | | 6/1987 |
| JP | 01016354 A | * | 1/1989 |
| JP | 01259211 A | * | 10/1989 |
| JP | 04336902 A | * | 11/1992 |
| JP | 2002321140 A | * | 11/2002 |
| RU | 1780930 A1 | * | 12/1992 |

OTHER PUBLICATIONS

JP 01016354 A was also published as JP 2651151B, a machine translation of JP 2651151B is provided.*

* cited by examiner

*Primary Examiner* — Daniel Howell
*Assistant Examiner* — Nicole N Ramos
(74) *Attorney, Agent, or Firm* — Head, Johnson & Kachigian, P.C.

(57) ABSTRACT

In order to be able to measure a diameter in a turning machine without rotating a workpiece and thus prevent circularity and concentricity errors from entering into the diameter determination, it is proposed according to the invention to use a measuring device that is movable in both transversal directions relative to the rotation axis, thus in the X-direction and also in the Y-direction, wherein the measuring device can scan the workpiece from both sides in one clamping step without rotating the workpiece.

8 Claims, 3 Drawing Sheets

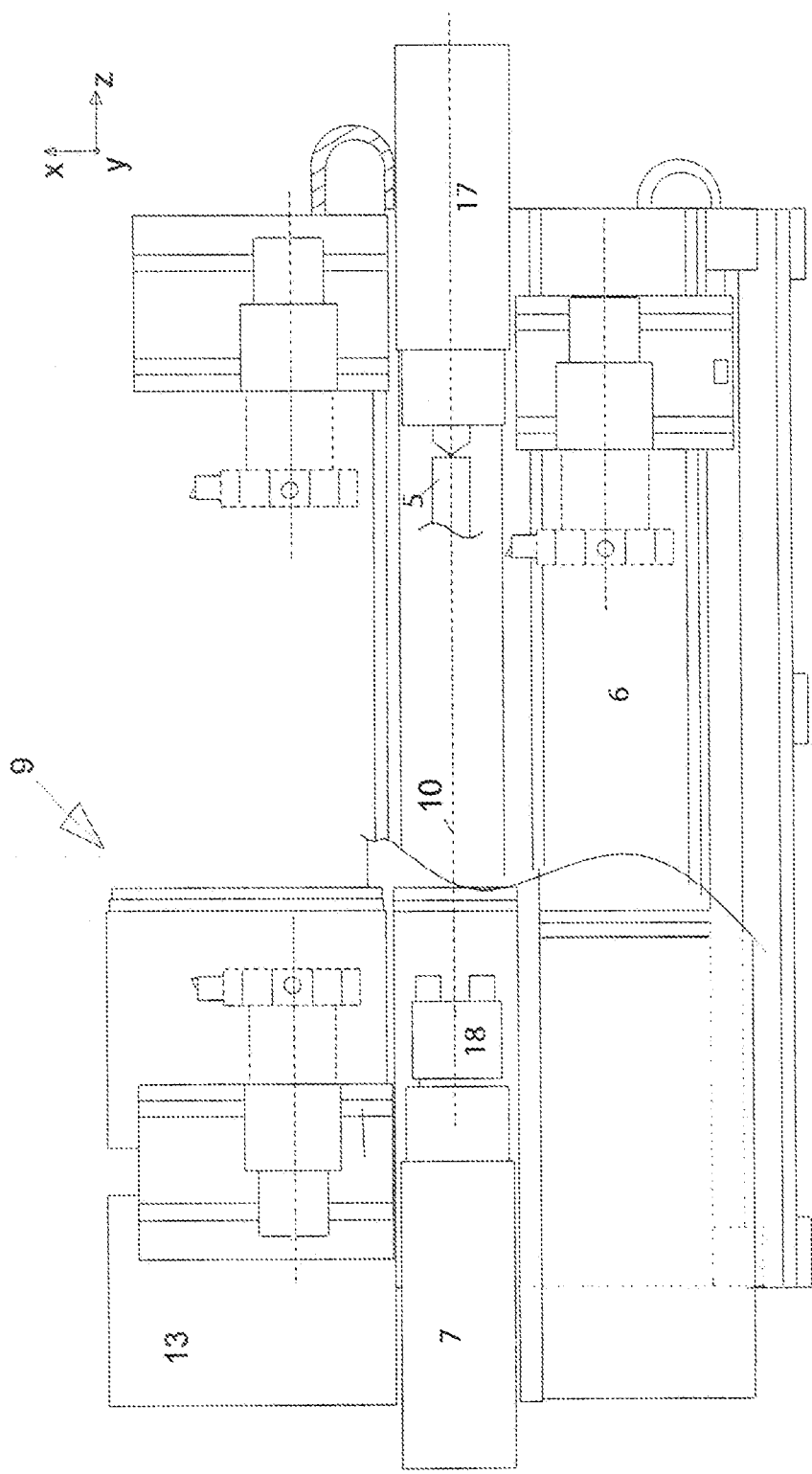

DIAMETER MEASUREMENT IN TURNING MACHINES

I. FIELD OF THE INVENTION

The invention relates to precisely measuring work piece diameters in conventional turning machines.

II. BACKGROUND OF THE INVENTION

In order to be able to precisely measure an original or presently machined diameter of a clamped work piece during a manufacturing process and in order to be able to adjust the subsequent machining accordingly it is already known to provide a turning machine with a measuring device with a measuring scanner which performs the measuring of the work piece through mechanical contact scanning or through optical scanning.

In conventional turning machines in which the head stock for driving the work piece is permanently mounted to a bed or moveable at the most in the Z-direction, the rotation axis, such measurement scanners were typically mounted on the bed moveable in X-direction in order to be able to move to the diameter to be measured until a contact is established and they were additionally moveable in Z direction in order to be able to measure at different axial positions.

Thus the employed mechanical measuring scanners preferably also protruded from their holders in the measuring direction, thus typically in X-direction against the axis of rotation.

This way, however, the radius of the work piece with respect to the rotation axis can only be measured in one direction.

When two measuring devices of this type were mounted in a conventional turning machine on two transversal directions arranged opposite to one another, e.g. a positive and a negative X-direction, a diameter e.g. of a crank shaft journal could be measured in the same rotational position of the work piece, however a sum of errors of both measuring devices was included in the measuring result and additional complexity was created through two measuring devices and a common computing contd.

III. DETAILED DESCRIPTION OF THE INVENTION a) Technical Object

Thus, it is an object of the invention to provide a measuring method and a respective configuration for a turning machine which solves the problem while still providing very precise direct measuring of a diameter of a work piece in a turning machine of this type.

b) Solution

The object is achieved through the features of claims 1 and 7. Advantageous embodiments can be derived from the dependent claims.

Since the measuring scanner is not only moveable in one transversal direction relative to the rotation axis, but in both transversal directions, the same diameter can be scanned and measured through the same measuring scanner sequentially at least at two different measuring locations of the circumference which facilitates particular using two measuring locations arranged opposite to one another and thus without changing the rotation position of the spindle and thus of the work piece.

The particular measurements thus determined are computed into a work piece diameter through a control and certainly considering the travel distances of the measuring scanner between the particular measurements.

The advantage is that the work piece stands still between the particular measurements at the same diameter, thus no errors are introduced into the measurement which are generated by having to move the work piece between particular measurements and e.g. through imprecisions in the support of the head stock or similar.

Certainly also simple radiuses of the work piece can be measured through scanning only on one side. Thus, the measuring sensor can be a mechanical measuring scanner or an optical measuring scanner. When using a mechanical measuring scanner the scanning direction is preferably selected transversal to the extension direction of the measuring scanner. A measuring scanner protruding in Y-direction from the holder is preferably used for scanning in X-direction. After measuring opposite to the X-direction the measuring scanner is moved away from the work piece and the holder is moved in Y-direction so that the measuring scanner is completely removed from the diameter to be measured and can be moved in X-direction to the other side of the diameter to be measured and can be brought in Y direction to the respective location of the diameter typically at the level of the rotation axis and the diameter is then contact scanned in X-direction.

Since high measurement precision is of the essence it also has to be excluded that any contaminations e.g. shavings from prior machining or similar accumulate at the work piece to be measured in the measurement area or at the scanner when a mechanical scanner is being used.

in order to prevent this, a cleaning of the measuring location at the work piece and\or of the measuring scanner is preferably performed before each measurement, preferably before blowing out with compressed air, when a compressed air nozzle is provided for this purpose. In a particularly simple embodiment, the compressed air nozzle is directly associated with the measuring scanner, and can simultaneously clean both reliably with an air blast when the measuring scanner approaches the work piece surface.

However, when an optical measuring scanner is used that operates touch free, the measuring light beam is preferably oriented in scanning direction, thus preferably vertically onto the workpiece surface in the measuring point to be measured and in order to measure two opposite measuring points at a circumferential work piece contour the optical measuring scanner typically has to be rotated in order to change the alignment of the measuring beam.

Thus, in order to prevent measuring errors caused by a mechanical rotation of the optical scanner, preferably two beam exits are provided at the measuring scanner, which are oriented in opposite directions, wherein the beam exits can be optionally activated and deactivated.

C) EMBODIMENTS

Embodiments of the invention are subsequently described in an exemplary manner with reference to the drawing figure wherein.

Figure 1B:
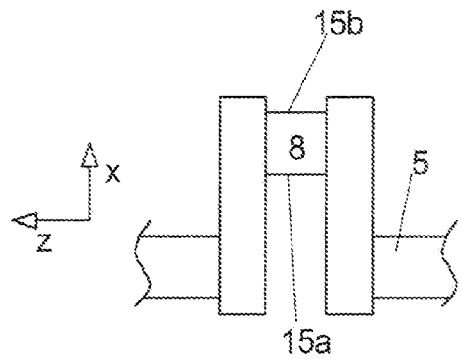
FIG. 1 illustrates turning machine with a Clamped work piece in a side view.

FIG. 1 illustrates a conventional turning machine 1; in which a head stock 7 with an opposing tailstock is mounted on a bed 6. A crankshaft can be clamped there between as a workpiece 5, thus supported as usual with one end in the jaw chuck 18 of the spindle stock 7, and supported at the other end e.g. by a tip of a head stock 17.

The detail view of FIG. 1b illustrates a top view a crankshaft journal, which is arranged eccentric to the rotation axis 10 of the clamped crankshaft whose diameter 8 shall be measured.

Figure 2:
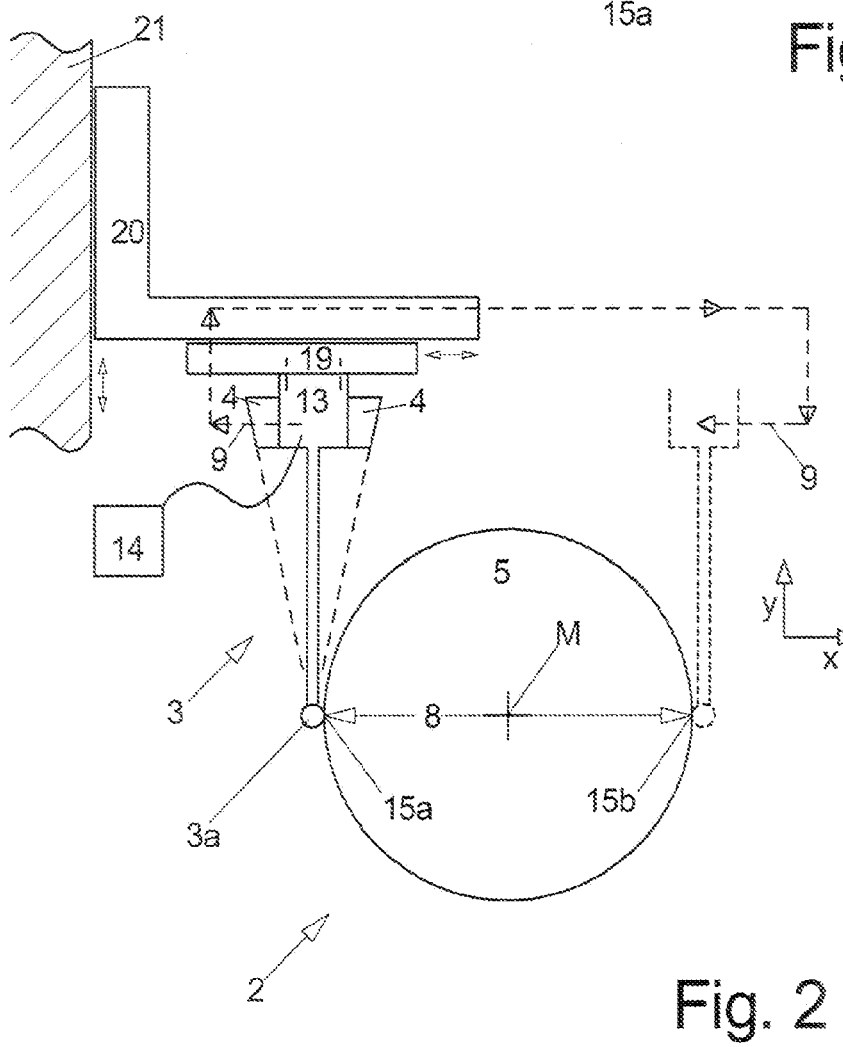
FIG. 2 illustrates the measuring method according to the invention with the scanner.

This diameter 8 is illustrated in an enlarged cross-section view in FIG. 2, including the measuring device 2 according to the invention.

Thus, a mechanical measuring scanner protrudes from its support 13 in Y-direction.

In order to perform a measuring method the stick shaped measuring scanner 3 with its preferably thickened free end 3a which represents the actual scanner, has to be approached in transversal direction to the extension of the measuring scanner 3, thus in this case in X-direction to the measuring location 15a of the contour until it contacts, wherein the measuring location in this case is a point of the diameter 8 which protrudes the most in negative X-direction.

As soon as this has been performed, the control 14 that is coupled with the measuring scanner 3 determines the current position of the holder 13, since the measuring device 2 which is mounted at the turning machine 1 through the holder 13 includes a drive which also includes a position measuring device for the holder 13.

Since also the direction in which the measuring scanner 3 protrudes from the holder 13 is known and also the dimensions of the scanner, thus in this case the diameter 3a of the spherical thickened free end of the measuring scanner 3, the control 14 can determine the exact position of the contact point between the measuring scanner 3 and the diameter 8 that is to be measured from this data.

It is self-evident for a rotation symmetrical work piece contour that the most forward protruding point in scanning direction 9, thus of the X-direction of the contour to be measured, thus in Y-direction at a level of the center M of the diameter 8 to be measured, is selected as a contact point.

As soon as the measuring of this measuring location 15a has been performed, the holder 13 of the measuring scanner 3 is lifted off from the work piece 5 opposite to the scanning direction 9, thus in X-direction and moved in Y-direction far enough so that the measuring scanner 3 can be moved in X-direction on the other side of the diameter to be measured without colliding with the work piece 5. At this location, the measuring scanner is moved forward again in Y-direction, until the free end 3a of the measuring scanner is again at the level of the center M of the diameter 8 and is then contacted again in negative X-direction at the second measuring location 15b, From the difference of the position data of the two contact locations thus determined at the measuring locations 15a and 15b the control 14 computes the diameter 8. When more than two measuring location are distributed over a circumference of the diameter 8 to be measured, for which the measuring scanner 3 has to be configured accordingly, thus it e.g. either has to be pivotable or also has to facilitate a scanning in longitudinal direction of a measuring scanner 3, not only the diameter, but the correct contour of the diameter 8 to be measured has to be measured without rotating the workpiece 5, and thus also e.g. eccentricities provided at the diameter 8.

Also non-circular workpiece contours can be measured in this manner directly in the machine tool when the workpiece stands still.

FIG. 2 furthermore illustrates the compressed air nozzle 4 arranged at the holder 13 of the measuring scanner 3, wherein the compressed air nozzle is oriented towards the free end 3a of the measuring scanner 3, and used for cleaning the measuring scanner 3 and also the workpiece surface with an air blast shortly before the workpiece 5 is being contacted. Certainly care has to be taken that the air bast is not so strong that it can damage e.g. bend the measuring scanner 3.

Since the measuring scanner is used for scanning in both transversal directions, the compressed air nozzle 4 is preferably provided in a double arrangement on sides of the holder 13 that are arranged opposite to one another and is oriented towards both sides of the free end 3a of the measuring scanner.

FIG. 2 furthermore illustrates the arrangement of the holder 13 on a slide system of the machine tool in a schematic pattern, in which the slide system is movable in X direction and in Y-direction.

Thus, it is evident that the holder 13 is preferably directly bolted to the slides, thus the slide 19, which is movable in scanning direction 9 on another slide, thus the Y-slide 20, which is movable itself in the other transversal direction, thus the Y-direction, at a locally fixated component of the machine tool or a Z-slide 21.

Figure 3:
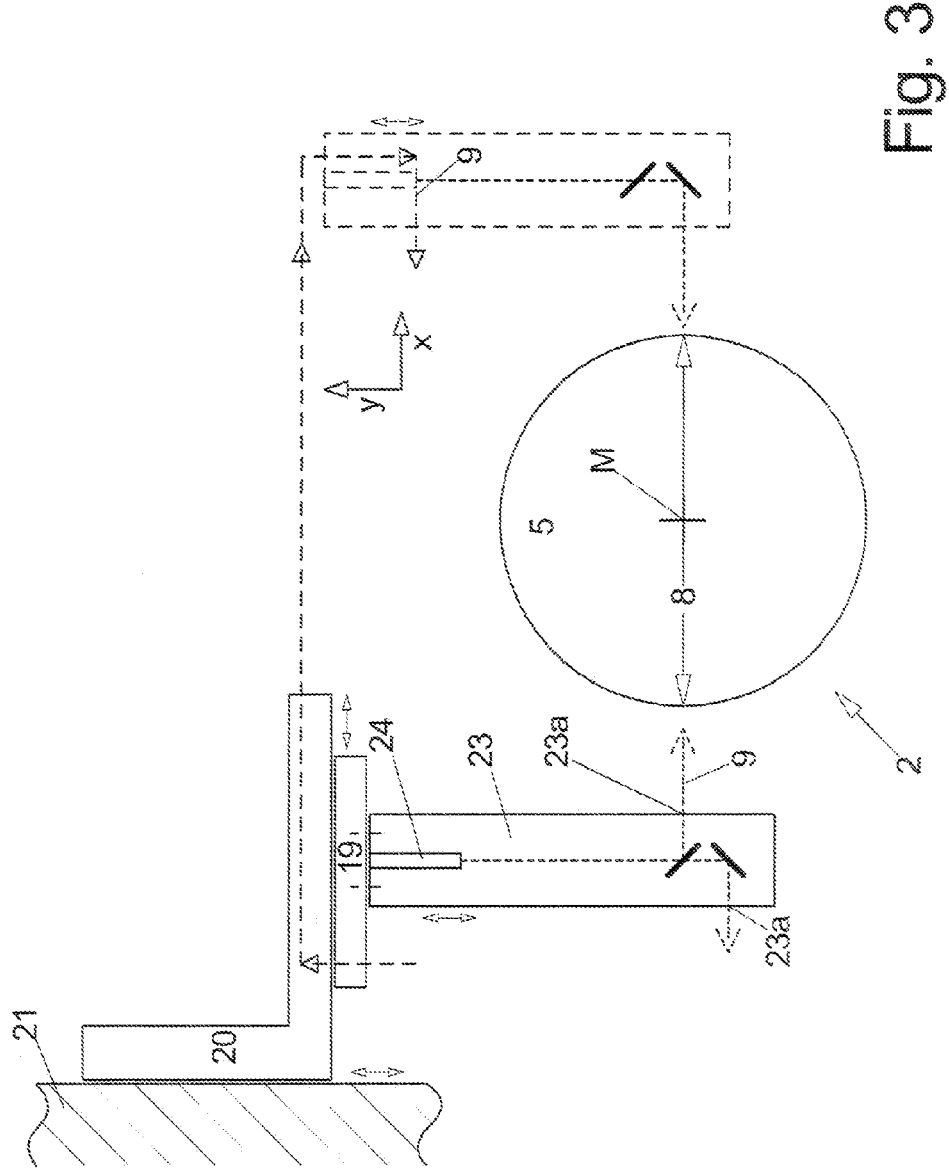
FIG. 3 illustrates the measuring method according to the invention with the optical scanner.

FIG. 3 illustrates: a solution With an optical touch-free measuring scanner 23 in which e.g. a laser source 24 generates a laser beam which is oriented against the workpiece 5 and whose beam reflected by the workpiece is detected by the measuring scanner 23 and the distance of the measuring scanner 23 from the workpiece 5 is determined there from.

In order to be able to scan the work piece 5 from both sides without having to rotate the optical scanner 23, the optical scanner 23 has two separate beam exits 23a and 23b which are oriented in a positive and a negative scanning direction 9, and which are generated from the same laser beam, e.g. through a semi-permeable and a non-permeable mirror 24a, b in the beam path of the laser beam. Alternatively opening one of the beam paths provides a scanning only in the intended positive or negative scanning direction.

Thus, a moving path of the optical measuring scanner 23 as recited supra with reference to the holder 13 of the mechanical measuring scanner 3 based on FIG. 4 suffices for measuring two measuring points 15 a, b arranged opposite to one another.

REFERENCE NUMERALS AND DESIGNATIONS

1 Turning machine
2 Measuring device
3 Measuring Scanner
3a Free End
4 Compressed Air Nozzle
5 Work Piece
6 Bed
7 Spindle Stock
8 Diameter
9 Scanning Direction
10 Rotation Axis (Z-direction)
11 X-direction
12 Y-direction
13 Holder
14 Control
15a, b Measuring Location
16a, b, c Movement Distance 17 Tailstock
18 Jaw Chuck
19 X-slide
20 Y-slide
21 Z-slide
22 Optical Measuring Scanner
23a, b Beam Exit
24a, b Mirror
M Center

The invention claimed is:

1. A turning machine (1), comprising:
   a headstock (7) arranged on a bed (6) and drivable in rotation about a rotation axis in Z-direction (10) and configured for receiving a workpiece (5); and
   a measuring device (2) with a measuring element for measuring the clamped workpiece;
   wherein the measuring element is movable in both transversal directions relative to the rotation axis, a X-direction (11) and a Y-direction (12), wherein the measuring element is a mechanical measuring scanner (3) and wherein the measuring scanner (3) protrudes from its holder (13) in one of the transversal directions relative to the rotation axis in Z-direction, and the other transversal direction is used as scanning direction (9).

2. The turning machine (1) according to claim 1, wherein one of the measuring elements is also movable in Z-direction (10).

3. The turning machine (1) according to claim 1, wherein turning machine (1), in particular the measuring device (2) includes a cleaning device which includes in particular an air nozzle (4), which is oriented towards the measuring location (15a . . . ).

4. The turning machine (1) according to claim 1,
   wherein turning machine (1) in particular the measuring device (2), includes a control (14), which
   controls contacting the diameter (8) to be measured from two opposite sides in a scanning direction (9),
   computes obtained results with one another, and
   optionally provides cleaning for the measuring location (15a, . . . ) before measuring.

5. A method for measuring a centric or eccentric diameter (8) of a workpiece (5) which is clamped in a turning machine (1) in a headstock (7) through a mechanical measuring scanner (3) of a measuring device (2) of a turning machine (1), comprising:
   measuring the workpiece with a mechanical measuring scanner (3) of a measuring device 2 wherein the measuring scanner protrudes from its holder (13) in one of the transversal directions relative to the rotation axis in Z-direction and wherein the measurement is performed at least at two different measuring locations (15a, b) preferably arranged opposite to one another of the diameter (8) for a stationary workpiece (5),
   measuring the different measuring locations (15a, . . . ) of the same diameter (8) is performed sequentially through the same measuring element, and
   the determined particular measurements are automatically computed into a diameter by a control (14) considering a movement of the measuring device recorded between the particular measurements.

6. The method according to claim 5, wherein the measuring location (15a, b, c) is cleaned in particular by blowing compressed air over it, before measuring the measuring location (15a, b, c).

7. The method according to claim 6, wherein cleaning the measuring location (15a, . . . ) before measuring is automatically caused by the control (14).

8. The method according to claim 5, wherein the measuring scanner (3) is cleaned before the measuring process, in particular also through the cleaning device for the measuring location (15, a, b, . . . ), in particular in the same process step.

* * * * *